W. H. KELLY.
Cultivator.
No. 34,578. Patented Mar. 4, 1862.
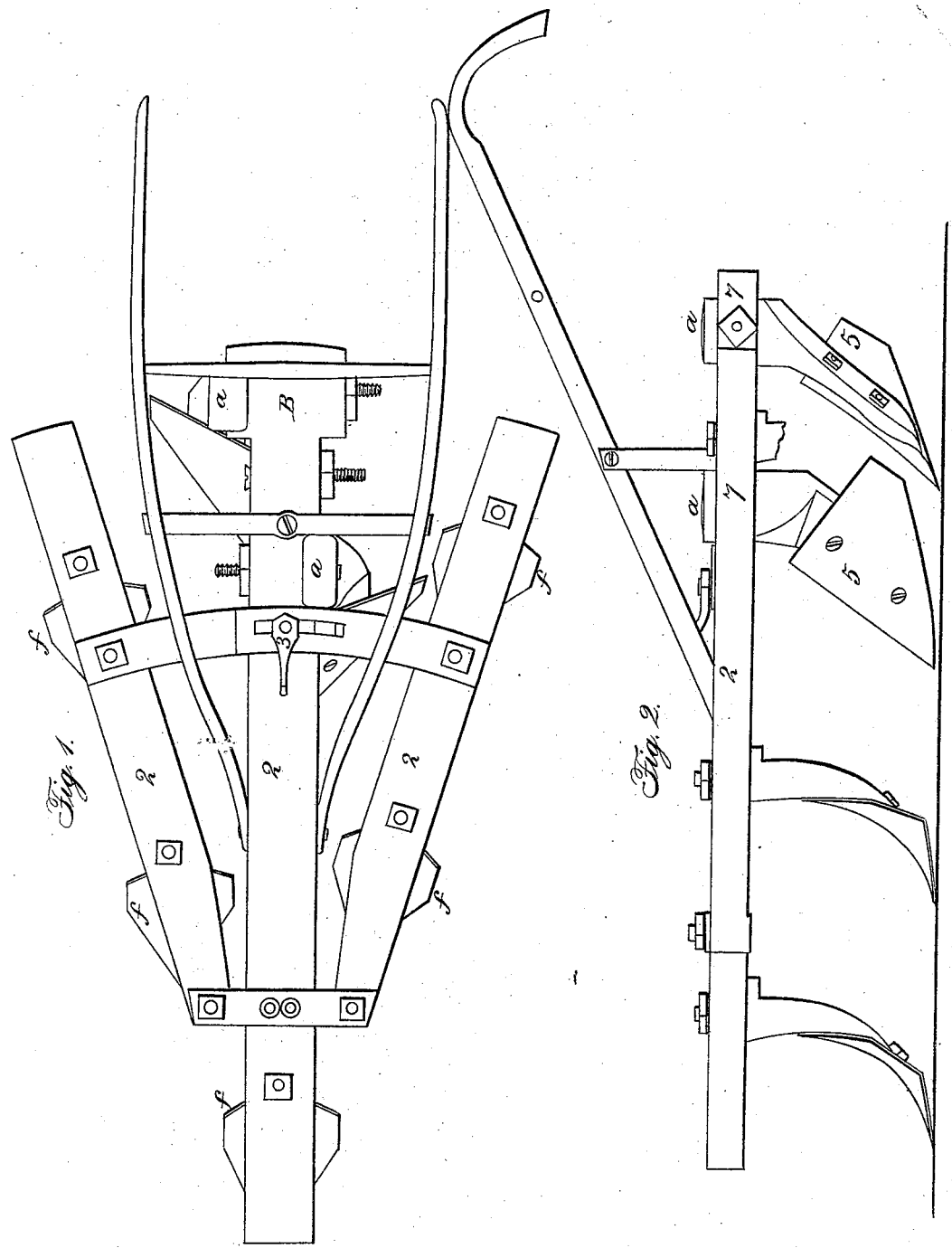
Witnesses:
J. H. Phillips
Thos. Hagerty
Inventor:
William H. Kelly.
AM. PHOTO-LITHO. CO. N.Y. (OSBORNE'S PROCESS.)

UNITED STATES PATENT OFFICE.

WILLIAM H. KELLY, OF ONONDAGA COUNTY, NEW YORK.

IMPROVEMENT IN CULTIVATORS.

Specification forming part of Letters Patent No. 34,578, dated March 4, 1862.

*To all whom it may concern:*

Be it known that I, WILLIAM H. KELLY, of the county of Onondaga, and State of New York, have invented a new and Improved Method of Constructing Cultivators; and I do hereby declare that the following is a full and exact description thereof, reference being had to the accompanying drawings, and to the letters of reference marked thereon.

To enable others skilled in the art to make and use my invention, I will proceed to describe its construction.

Figures 2 2 2 are three beams in which teeth are fastened, the shanks of which are made of cast-iron and the points of steel, which teeth are marked $ff$ in the drawings, and are fastened to the beams by means of bolts and nuts. The steel points are fastened to the shanks by similar bolts, &c. The teeth mentioned may be from ten to twelve inches in length, as circumstances may render expedient.

3 is a thumb-nut, by means of which the cultivator may be made of any width required.

Fig. 4 in the side view represents the middle beam, in the back part of which two wings (marked 5 5) are fixed in such a manner that one can be placed forward of the other, and thus prevent the sods from gathering in front of the teeth and choking, as in the ordinary shovel-plow. Where the ground is free from sods, &c., the wings may be placed opposite each other, and as wide as occasion may require. The back portion of the center beam being wide, it will be seen at once that a wide furrow can be cut and the dirt thrown each way, thus saving a great amount of labor in cultivating corn or other crops where the hill is formed by hand-work.

Having thus described my invention, what I desire to procure Letters Patent for is—

The combination of the central beam, made as described, with the shares 5 and shanks $a$, when constructed and operating as set forth, and attached to the beam by means of clasps and bolts, as shown by Figs. 7 7.

WILLIAM H. KELLY.

Witnesses:
 I. A. GRAHAM,
 THOS. H. UPPERMAN.